(No Model.)
R. C. CARPENTER.
APPARATUS FOR TESTING INDICATOR SPRINGS AND STEAM GAGES.
No. 519,235. Patented May 1, 1894.
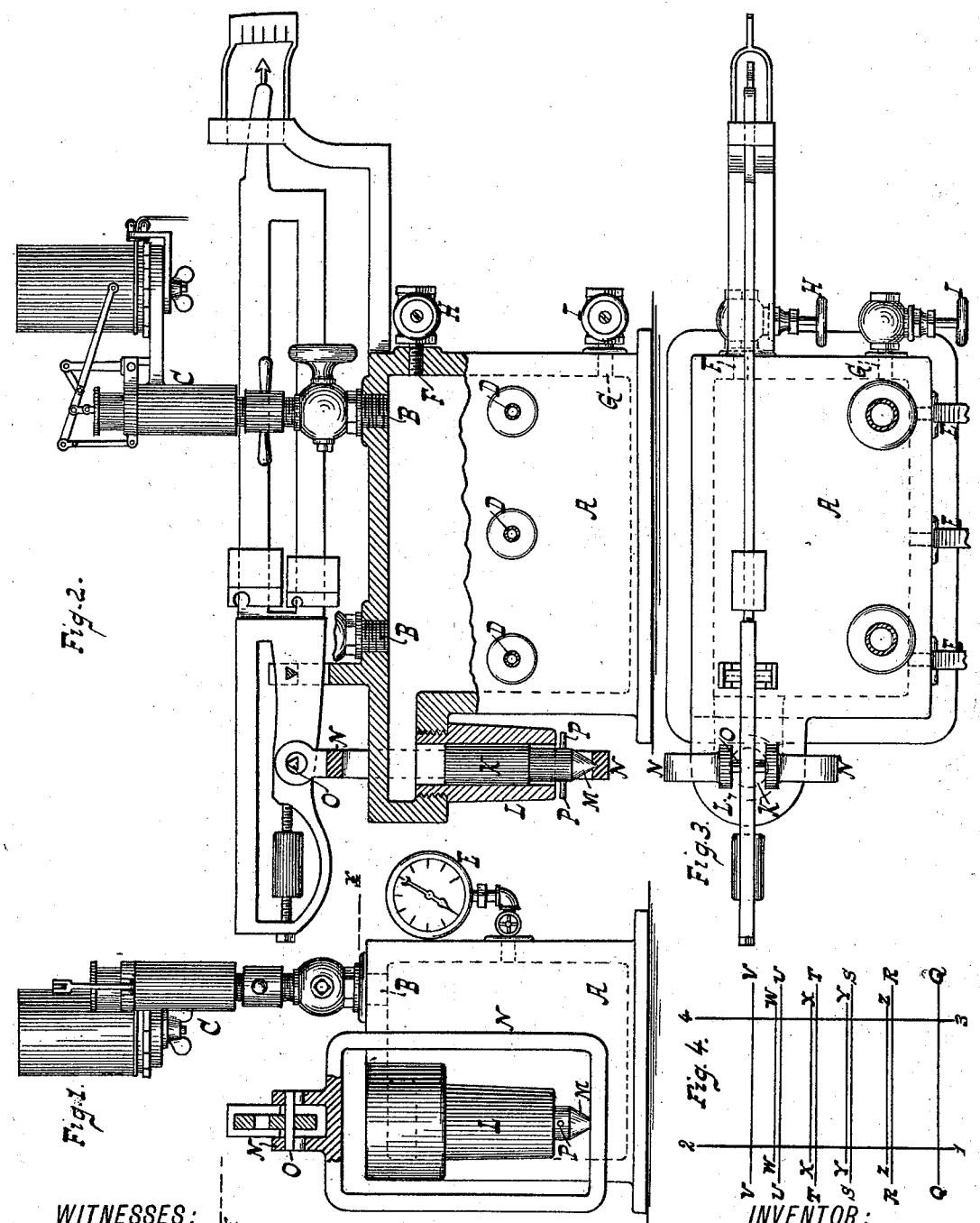
WITNESSES:
William Miller
Chas. E. Poenigen.
INVENTOR:
Rolla C. Carpenter
BY
Hauff & Hauff
ATTORNEYS.

UNITED STATES PATENT OFFICE.

ROLLA C. CARPENTER, OF ITHACA, NEW YORK, ASSIGNOR TO SCHÄFFER & BUDENBERG, OF MAGDEBURG-BUCKAU, GERMANY, AND NEW YORK, N. Y.

APPARATUS FOR TESTING INDICATOR-SPRINGS AND STEAM-GAGES.

SPECIFICATION forming part of Letters Patent No. 519,235, dated May 1, 1894.

Application filed October 5, 1893. Serial No. 487,239. (No model.)

*To all whom it may concern:*

Be it known that I, ROLLA C. CARPENTER, a citizen of the United States, residing at Ithaca, in the county of Tompkins and State of New York, have invented new and useful Improvements in Apparatus for Testing Indicator-Springs and Steam-Gages, of which the following is a specification.

The usefulness of the machine will appear from the fact that, the power of steam engines is frequently determined by the use of the steam engine indicator. This instrument produces a diagram by the resistance of a spring to the pressure of the steam. The power of the engine is determined by measuring this diagram. The force exerted can be determined provided the pressure required to move the spring a definite amount is known. A convenient way is to mark on each spring the force required to run such spring one inch, but in case such marks are not reliable errors will result. Unless the exact strength of the spring is known errors will result from its use, and the determinations made with the indicator will be of little or no value. Steam gages are used to determine the pressure of steam in a boiler, and serious accidents may occur because of the incorrect reading of the gage.

The object of my invention is to provide an apparatus for testing indicator springs which will be accurate and of practical form, and of such a nature as to be readily moved from place to place.

My apparatus is convenient for use not only by manufacturers of springs, but also elsewhere.

The apparatus or machine invented for this purpose by myself is portable in form, convenient and easy of application and gives results of exceeding accuracy.

This invention is illustrated in the annexed drawings, in which—

Figure 1 is an end elevation of the apparatus. Fig. 2 is a face elevation of Fig. 1. Fig. 3 is a plan view sectioned along $x\ x$ Fig. 1. Fig. 4 shows a diagram made in testing the indicator.

The instrument or apparatus consists of a closed vessel A, which is made strong enough to resist a great pressure, say an internal steam pressure of about two hundred pounds per squre inch and which is provided with holes at B into which can be screwed the connections for an indicator C. It is also provided with holes D D, to which steam gages E can be attached, so as to be under the same conditions as in actual use. Any or all these holes can be made in the top or side of the vessel without making any material difference. A hole is made at F through which steam can be supplied to the vessel, and another is made at G through which the steam can be discharged. Pipes to which are connected valves H I are fastened in each of these holes. The valve H is connected with the steam boiler or other supply of steam, and by regulating the amount of opening of the valves H and I any desired pressure, less than that in the steam boiler, can be secured and maintained in the vessel A.

For accurately measuring the pressure which is contained in the vessel A, a manometer is used which consists of a piston K of known area, and which is free to move in the inclosing cylinder L. The area of the piston is conveniently taken as exactly one half square inch, so that the pressure acting on the piston is equal to one half that acting on a square inch of the vessel. The lower portion of the piston is pointed at M and rests in a yoke N. This yoke is suspended on the knife edge O of a pair of scales, and if the scales are previously balanced, before turning on steam, it is evident that the reading of the scales will give the pressure acting on each element of the vessel equal in area to that of the piston. In making practical tests the scales were graduated to read to fiftieths of a pound, and I found that this fine reading will do very good work. This piston is so constructed that it can readily and easily be rotated, by turning the piston by means of the pin P thus eliminating friction between the piston and the parts, or the friction may be eliminated by jarring. The piston can readily be removed for cleaning or oiling by slightly raising the piston and swinging the yoke N to one side.

In using the machine I proceeded as follows: The indicator was connected to the vessel A as shown at B, steam turned on into the vessel A to gradually warm it and allowed to blow through the indicator. The steam was then shut off and paper put on the indicator drum, on which paper two vertical lines are ruled as 1—2 and 3—4. The indicator pencil was pressed against the drum and a horizontal line Q Q drawn at the point thus marked. The poise on the scale was then set at say five pounds, and steam turned on into the vessel, gradually rising in pressure until the scale floated. When the pressure is exact the line R is drawn, and so on for successive pressures of five pounds, until the limit of the spring is reached. During this operation the motion of the indicator pencil is kept continuously upward, if at any time the pressure rises too high, it is lowered by manipulating the valves, below the required amount and then gradually raised to the correct point. When the indicator pencil has reached its highest position, the steam pressure is allowed to fall gradually and a series of similar lines as W X Y and Z drawn during the descent of the piston, the motion being continuously downward. The distance between any two of these lines as Z R indicates the loss due to friction of the indicator. By measurement of the distance between any two lines as Q R or R S on this diagram the exact distance moved for a given pressure becomes known, and the correct scale of the indicator spring is thus ascertained. This scale is the number of pounds required to compress the spring one inch. The apparatus thus gives this force, under the actual conditions under which the steam is used, and permits the testing to be performed in the actual indicator which is used for determining the power of the engine.

For testing steam gages I proceed as follows: The steam gage is connected to one of the lateral openings, with a siphon in exactly the same condition as for use on a steam boiler. Steam is then turned on, the reading of the gage and the manometer noted and compared.

In the instruments as shown in the drawings two indicators and three steam gages can be connected and tested at the same time, but of course I do not limit myself to testing only this number of indicators and gages.

The dependent valves, H I, Fig. 2, enable the pressure in chamber A to be regulated as desired, and said pressure, when regulated, will remain constant, so that accurate observation can be made.

What I claim as new, and desire to secure by Letters Patent, is—

A vessel or steam chamber having its top plate or cover provided with an indicator and with a scale beam fulcrumed on said top plate or cover, combined with a yoke connected to the scale beam, a piston connected to the yoke, and an inclosing cylinder for the piston made to communicate with the interior of the chamber, substantially as described.

In testimony whereof I have hereunto set my hand in the presence of two subscribing witnesses.

ROLLA C. CARPENTER.

Witnesses:
   EDWARD HAGEMAN, Jr.,
   WALTER I. PRATT.